United States Patent

[11] 3,634,041

[72] Inventors John H. Ryan;
Jerome A. Lukes; Ulrich E. G. Neitzel, all of Ogden, Utah; Hubert P. J. Duyster, Bad Salzdetfurth, Germany
[21] Appl. No. 799,376
[22] Filed Feb. 14, 1969
[45] Patented Jan. 11, 1972
[73] Assignee Great Salt Lake Minerals and Chemicals Corporation
New York, N.Y.

[54] METHOD FOR THE PRODUCTION OF POTASSIUM SULFATE FROM POTASSIUM-CONTAINING DOUBLE SALTS OF MAGNESIUM SULFATE
14 Claims, 2 Drawing Figs.

[52] U.S. Cl............................................. 23/297,
23/121, 23/298, 23/302
[51] Int. Cl............................................. C01d 5/06,
C01d 5/00
[50] Field of Search................................ 23/296,
297, 298, 302, 121, 304, 128

[56] References Cited
UNITED STATES PATENTS

| | | | |
|---|---|---|---|
| 3,082,063 | 3/1963 | Cerdalli.................... | 23/121 |
| 3,528,767 | 9/1970 | Garrett..................... | 23/121 |
| 2,902,343 | 9/1959 | Saccardo.................. | 23/121 |
| 2,902,344 | 9/1959 | Cerdalli et al............ | 23/121 |
| 3,207,576 | 9/1965 | Marullo et al............ | 23/121 |
| 3,003,849 | 10/1961 | Veronica................... | 23/128 |

Primary Examiner—Norman Yudkoff
Assistant Examiner—S. Silverberg
Attorney—David V. Trask ABSTRACT: Essentially pure schoenite is leached to produce potassium sulfate and a sulfate leach liquor. The sulfate leach liquor is then brought into contact with a crystal crop predominating in potassium-containing double salts of magnesium sulfate. The quantity of double salt mixed with the leach liquor is limited to that which nearly saturates the liquor with respect to sodium chloride. There results a slurry of essentially pure schoenite in schoenite-conversion end liquor. The schoenite is recycled to the leaching step, and the conversion end liquor is recycled to a solar pond system wherein the potassium values remaining in the conversion end liquor are recovered.

3,634,041

METHOD FOR THE PRODUCTION OF POTASSIUM SULFATE FROM POTASSIUM-CONTAINING DOUBLE SALTS OF MAGNESIUM SULFATE

BACKGROUND OF THE INVENTION

1. Field

The present invention relates to the production of potassium sulfate. Specifically it relates to the production of potassium sulfate from potassium-containing double salts of magnesium sulfate by an intermediate step involving the production of essentially pure schoenite.

2. State of the Art

Procedures are known whereby potassium-containing double salts of magnesium sulfate are converted to hydrated potassium magnesium sulfate, notably schoenite, and the schoenite is leached to produce potassium sulfate. To produce high-purity potassium sulfate, it is essential that the schoenite subjected to leaching be essentially pure, i.e., that it be essentially free from sodium chloride impurities; however, the prior art processes all produce substantial amounts of sodium chloride in admixture with the schoenite. Accordingly, the prior art processes have incorporated various means for separating schoenite from the sodium chloride produced therewith during the conversion procedure. Most such processes subject the sodium chloride-schoenite mixture to froth flotation to remove the sodium chloride, although other separation procedures are sometimes used.

U.S. Pat. No. 2,902,334, for example, discloses a method whereby hydrous potassium magnesium sulfate is produced by the decomposition of kainite, and potassium sulfate is subsequently produced by decomposition of the hydrous potassium magnesium sulfate with water. According to that patent, either schoenite or leonite crystals are produced in admixture with sodium chloride by contacting kainite with recycled solution that results from leaching the schoenite or leonite with water to produce potassium sulfate.

U.S. Pat. No. 3,004,826 discloses a similar method whereby schoenite is produced in two stages. First, sulfate-containing leach liquor resulting from the leaching of schoenite to produce potassium sulfate is recovered and mixed with kainite in an amount such that all of the NaCl in the kainite crystal crop is dissolved. As a result, a crystal phase consisting of essentially pure schoenite and an intermediate sulfate liquor is contacted with additional kainite material to produce additional schoenite in admixture with NaCl. The schoenite is separated from the NaCl of the second crystal crop by a volumetric classification system.

Thus, the prior art, as represented by these patents, has always been confronted with the necessity of separating NaCl from schoenite prior to converting the schoenite to potassium sulfate by leaching.

SUMMARY OF THE INVENTION

The present invention provides an improved method for the production of potassium sulfate from hydrous potassium magnesium sulfate, such as schoenite ($K_2SO_4 \cdot MgSO_4 \cdot 6H_2O$) or leonite ($MgSO_4 \cdot K_2SO_4 \cdot 4H_2O$). Although the invention will be described with reference to schoenite, it should be understood that other forms of hydrous potassium magnesium sulfate may, in appropriate circumstances, replace all or part of the schoenite in the process.

According to this invention, schoenite is leached in conventional fashion with water to produce a slurry of potassium sulfate in a sulfate leach liquor. The sulfate leach liquor is separated from the $K_2SO_4$ product and is forwarded to a schoenite-conversion procedure wherein it is mixed with appropriate feed materials, comprising potassium-containing double salts of magnesium sulfate, to produce a slurry of schoenite in a schoenite-conversion end liquor. Rather than producing schoenite in admixture with sodium chloride, as is done by the prior art, the claimed process produces a slurry of essentially pure schoenite in a schoenite-conversion end liquor. The schoenite product is separated and recycled, without being treated for the removal of NaCl to the schoenite leaching procedure, and the schoenite-conversion end liquor, which still contains substantial quantities of potassium, is forwarded to solar ponds that are operated to produce crystal crops including potassium-containing double salts of magnesium sulfate. In this way, the potassium values of the conversion end liquor are salvaged. The potassium-containing double salts produced in the solar ponds are eventually harvested and fed to the schoenite-conversion step of the process. Thus, the potassium values leaving the potassium sulfate plant with the conversion end liquor are recycled to the plant with new feed material, thereby permitting a theoretical yield for the process of 100 percent, ignoring pond leakages and normal plant losses.

An especially important benefit of the claimed invention is the avoidance of procedures to remove schoenite from admixture with impurities, notably NaCl. The present invention produces substantially pure schoenite in high enough yield during the schoenite-conversion procedure that the proportion of recycle of potassium values through the solar ponds is within acceptable limits.

In the practice of this invention, the amount of potassium-containing double salts of magnesium sulfate converted to schoenite by the total process is limited to that amount of such double salts contained in the quantity of material fed to the schoenite-conversion step which just saturates the sulfate leach liquor fed to that step with sodium chloride. Accordingly, it is important to control the composition of the feed materials to the schoenite converter to maximize the amount of potassium-containing double salts which may be converted to schoenite prior to the sulfate leach liquor's becoming saturated with NaCl. To this end, it is important to limit the amount of sodium chloride in the feed materials, as well as to limit the amounts of other minerals or salts, notably magnesium chloride, which depress the solubility of sodium chloride in water. Thus, it is desirable to limit the amount of potassium-containing double salts of magnesium chloride, such as carnallite, introduced with the feed materials to the plant.

Composition of the feed to the schoenite-conversion step can vary widely. The feed material will generally include potassium-containing double salts of magnesium sulfate, such as kainite, schoenite, and leonite, in admixture with halite and free magnesium sulfate hydrates. It may include other potassium-containing minerals, such as carnallite and sylvite, and minor amounts of other water-soluble constituents which have no appreciable effect on the process, such as glaserite, Glauber salt, astrakanite, borates, bicarbonates and organics. It is essential for the operation of the present invention that the feed material composition be such that all of the soluble impurities, notably NaCl and free $MgSO_4$ hydrates, be completely dissolved while all of the potassium-containing minerals are converted to schoenite, so that there results from the schoenite-conversion procedure a slurry of essentially pure schoenite in schoenite-conversion end liquor. In nearly all instances, the major impurity in the feed material; i.e., the impurity which will first saturate the conversion end liquor when the impurities are dissolved, is sodium chloride. Sometimes, epsomite is the major impurity and will first saturate the end liquor. The yield of the process is highest when the conversion end liquor is just saturated or nearly saturated with the major impurity, usually NaCl.

The composition of the sulfate leach liquor is ideally that which results from leaching all of the $MgSO_4$ and any incidental impurities carried by the schoenite. Accordingly, the sulfate leach liquor is normally just saturated with respect to $MgSO_4$ and contains a lesser concentration of $K_2SO_4$, with no more than negligible amounts of other materials. The precise composition of the leach end liquor will depend upon the temperature maintained during the leaching step, as well as the quantity of water employed for the leach. Typical sulfate leach liquors resulting from a leach conducted at about 45° C. to about 55° C. contain about 30 to about 35 moles $MgSO_4$ and about 19 to about 21 moles $K_2SO_4$ per 1,000 moles $H_2O$.

The feed materials suitable for the process are conveniently defined by the permissible composition of the schoenite-conversion end liquor resulting from contacting the feed materials with sufficient sulfate leach liquor to produce essentially pure schoenite. Such an end liquor will contain $Mg^{++}$, $SO_4^=$, $Cl^-$, $K^+$, and $Na^+$ as the significant constituents and may be considered to be a solution of $MgSO_4$, $MgCl_2$, KCl (and/or $K_2SO_4$) and NaCl dissolved in various proportions, depending upon the compositions of the various minerals in the feed material. As was noted previously in this disclosure, $MgCl_2$ in the conversion end liquor depresses the solubility of sodium chloride therein. Accordingly, the amount of $MgCl_2$ in the end liquor must be maintained relatively low to permit treatment of adequate quantities of feed materials containing NaCl as an impurity. The present invention contemplates the use of feed materials which produce conversion end liquors containing from practically 0 moles $MgCl_2$, resulting when the potassium-containing double salt of magnesium sulfate contained in the feed material is essentially all schoenite, up to about 30 moles $MgCl_2$ per 1,000 moles $H_2O$, resulting when the feed material contains some carnallite or other magnesium chloride-containing materials. When schoenite is the only significant potassium salt in the feed material, the end liquor contains proportionately more sulfate and less chloride. In general, the conversion end liquor of this invention should be approximately saturated, preferably just under saturated, with respect to sodium chloride, and should contain less than about 30 moles of magnesium chloride per 1,000 moles of water. The conversion end liquor should be unsaturated with respect to $MgSO_4$, but must carry all of the $MgSO_4$ introduced into the process with the feed material. The amount of potassium in the conversion end liquor will depend upon the concentrations of the other constituents therein and typically will range from about 30 to about 50 percent of the potassium introduced to the process with the feed materials.

Because schoenite is metastable under the conditions maintained in the schoenite-conversion step of the process, astrakanite ($Na_2SO_4 \cdot MgSO_4 \cdot 4H_2O$) being the stable solid phase, the conversion reaction must be conducted under carefully controlled conditions to prevent the conversion of schoenite to astrakanite. Thus, the reaction temperature is kept low, i.e., below about 30° C., typically between about 15 and about 25° C.; residence time of the materials in the schoenite conversion reactor is kept low; i.e., below about 30 minutes, typically about 20 minutes; and ultimate sodium chloride saturation is avoided; i.e., although the sodium chloride concentration may exceed its saturated concentration during some intermediate portion of the conversion step, it should be reduced to below its saturated concentration prior to completion of this step, that is, before the schoenite is recovered for further processing.

The preferred feed material to the process of this invention is a high-grade kainite crystal crop, i.e., a crystal crop containing kainite as the principal potassium-containing double salt of magnesium sulfate in admixture with free hydrated $MgSO_4$, notably epsomite, and sodium chloride. The mixture preferably contains at least about 70 percent by weight kainite and up to about 15 to about 20 percent NaCl, the remainder being essentially all epsomite. Some of the kainite and epsomite may be prereacted prior to being introduced to the schoenite-conversion step of the process, so that a portion of the feed material is introduced as schoenite. The greater the proportion of schoenite present in the feed, the greater the proportion of NaCl which may be present therein. As indicated previously in this disclosure, the process of this invention is operable even with feed materials in which schoenite is the only significant potassium-containing salt. In that event, the feed material may include as much as 40 percent by weight NaCl. Although some $MgCl_2$ in the feed material is tolerated by the process, it is preferable that the feed contain less than about 10 percent carnallite or similar magnesium chloride-containing mineral. When such materials are present in the feed, the permissible amount of NaCl in the feed is decreased because of the depressive effect of $MgCl_2$ on the solubility of NaCl.

DESCRIPTION OF THE DRAWINGS

In the drawings, which show the procedures presently contemplated as the best mode for carrying out the invention.

DETAILED DESCRIPTION OF THE ILLUSTRATED EMBODIMENTS

Figure 1:
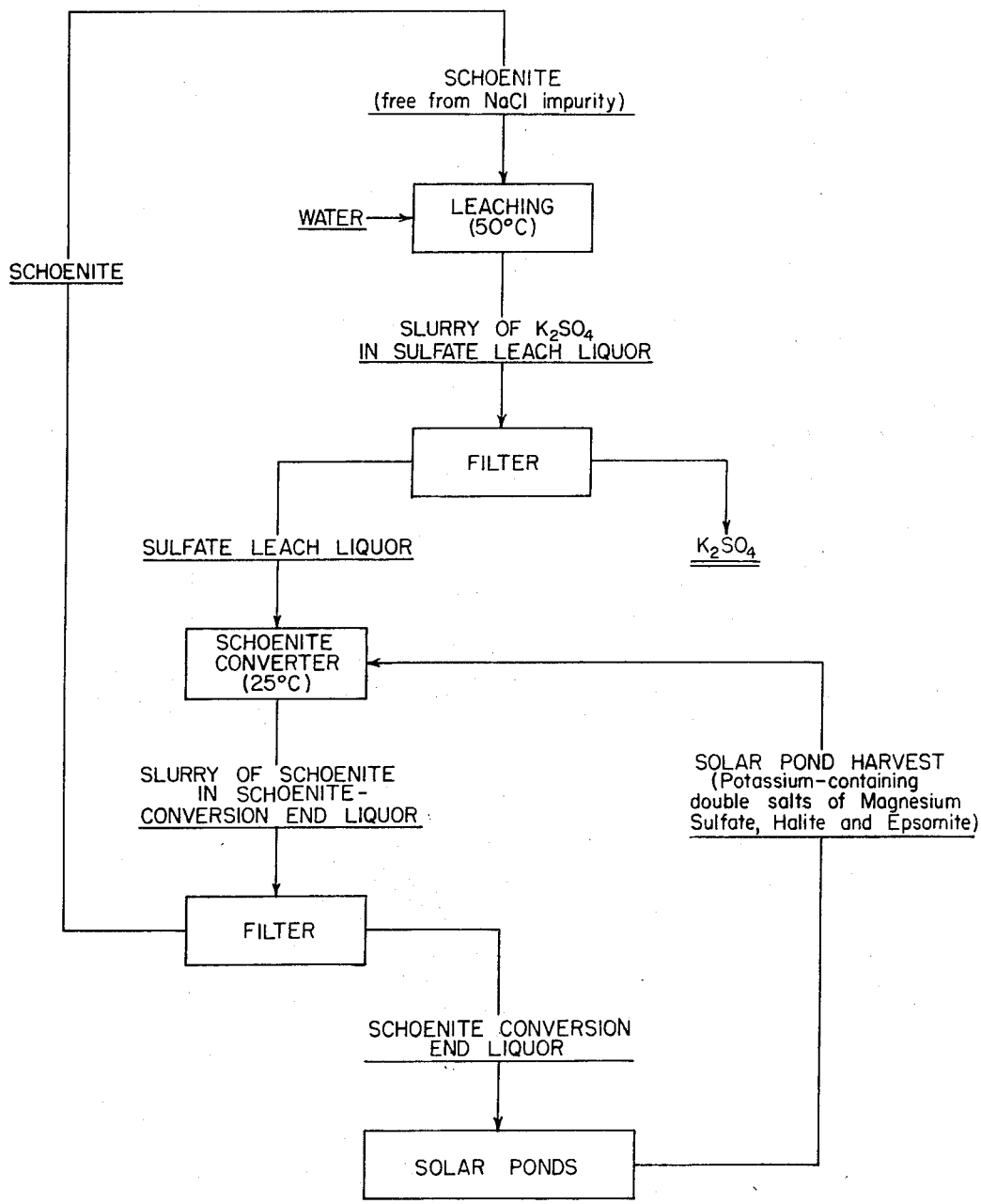
FIG. 1 is a flowsheet of a potassium sulfate plant, including the improvement of the present invention, operating in conjunction with solar ponds which produce feed materials for the plant.

Referring to FIG. 1 of the drawings, essentially pure schoenite is leached with water at about 50° C. in conventional fashion to produce a slurry of potassium sulfate in a sulfate leach liquor containing about 32 moles $MgSO_4$ and about 20 moles $K_2SO_4$ for each 1,000 moles of water. The slurry is filtered and about 12 moles of high-grade potassium sulfate product is recovered for each 1,000 moles of water in the sulfate leach liquor filtrate.

The sulfate leach liquor is then transferred to a schoenite converter operating at about 25° C. Feed material, such as that produced in accordance with copending application Ser. No. 735,840, filed July 10, 1968, the disclosure of which is incorporated by reference herein, containing on a weight basis about 70 percent kainite, 20 percent NaCl, and 10 percent epsomite, is fed to the schoenite converter in proportions which result in a slurry of essentially pure schoenite in a schoenite-conversion end liquor containing all of the sodium chloride and epsomite of the feed material and being nearly saturated with respect to NaCl. The composition of the schoenite-conversion end liquor is about 32 moles $MgSO_4$, 12 moles $MgCl_2$, 16 moles KCl, and 48 moles NaCl per 1,000 moles $H_2O$. The slurry is filtered, and about 32 moles of essentially pure schoenite is recovered for each 40 moles of KCl in the kainite harvest. The composition of the kainite harvest is about 44 moles $MgSO_4$, 40 moles KCl, 48 moles NaCl, and 192 moles $H_2O$.

The schoenite-conversion end liquor, which contains about 32 moles $MgSO_4$, 12 moles $MgCl_2$, 16 moles KCl, and 48 moles NaCl per 1,000 moles $H_2O$, is cycled to solar ponds wherein it is treated for the recovery of the potassium values it carries as additional potassium-containing double salts for use as feed for the schoenite converter. The schoenite-conversion end liquor may advantageously be treated to recover valuable feed constituents for a salt cake plant prior to its being blended with other brines for the production of a kainite or similar crystal crop. Such a treatment is not detrimental to the claimed process an may in some instances even be beneficial, because of the removal of sodium ions from the recycled brine.

Figure 2:
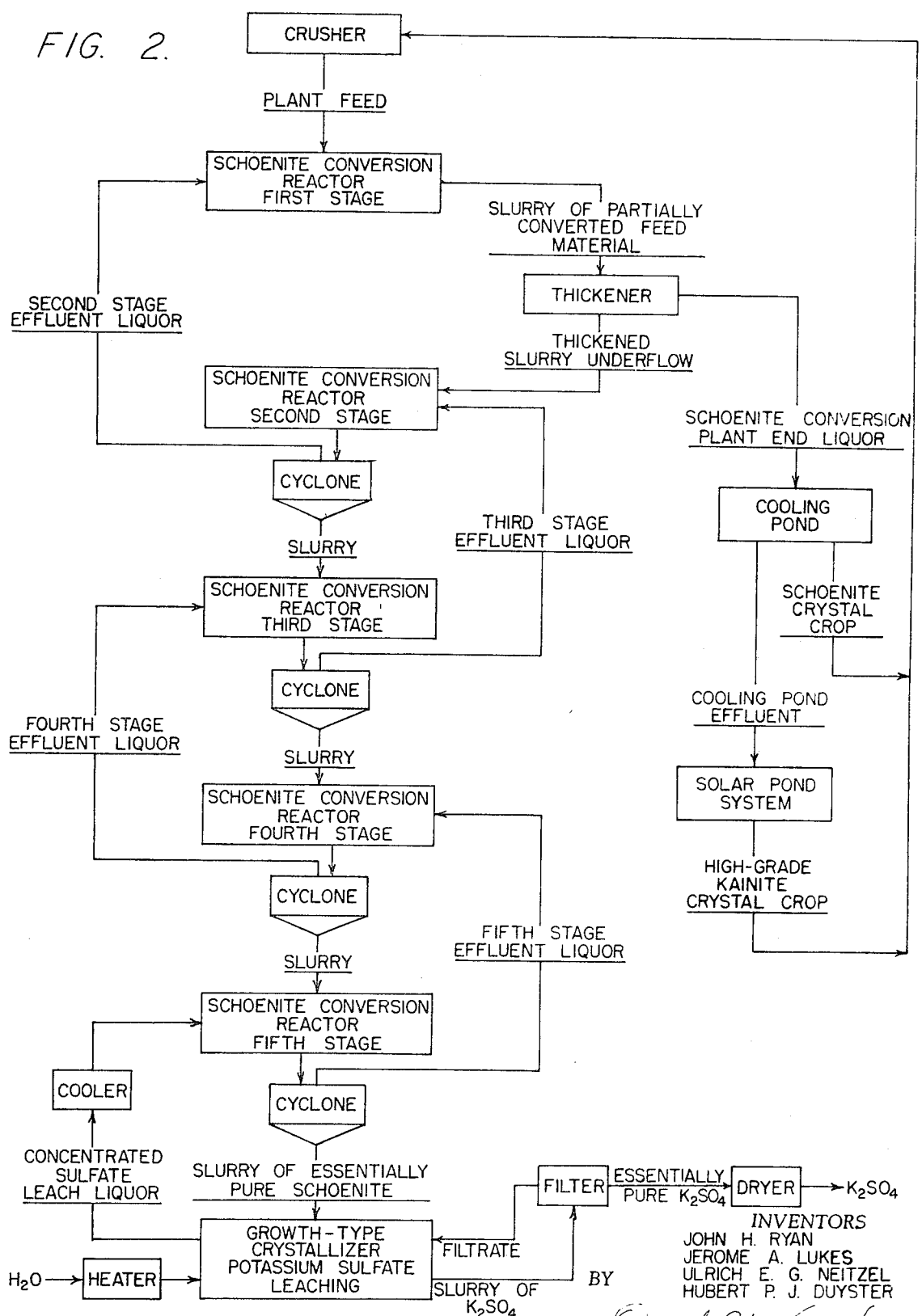
FIG. 2, a more detailed flowsheet illustrating an alternative embodiment of the invention.

According to the process illustrated by FIG. 2, a high-grade kainite crystal crop is harvested from a solar pond system and is crushed, together with schoenite material harvested from a cooling pond, to break up any large lumps. The crushed kainite and schoenite material constitutes the feed to the schoenite-conversion section of the plant.

The schoenite-conversion section of the plant includes five reactor stages, each of which is a large tank. This section of the plant is arranged for countercurrent flow, with the slurry discharge from the second through the fifth stage reactors being classified in cyclones so that the overflow liquor from each stage is recycled to the preceding reactor and the tailings are forwarded to the next reactor. In this fashion, the first-stage reactor receives crushed plant feed and produces schoenite-conversion end liquor for recycle through a cooling pond to a kainite-producing solar pond system. In the first stage, the plant feed is contacted with recycled effluent liquor from the second stage to partially convert the kainite therein to schoenite. A slurry of the partially converted feed material in first-stage reactor effluent liquor is withdrawn from the reactor to a thickener. The overflow from the thickener constitutes the schoenite-conversion plant end liquor, while the thickened slurry underflow constitutes the feed fro the second-stage reactor. In the second-stage reactor, the feed is contacted with sulfate leach liquor recycled from the third-stage reactor, and so on, until the fifth reactor stage, which receives concentrated sulfate leach liquor from the subsequent leaching section of the process and discharges a slurry of essentially pure schoenite.

The schoenite slurry from the fifth-stage schoenite-conversion reactor is classified by a cyclone, and the cyclone underflow containing the schoenite is introduced to a growth-type crystallizer wherein the schoenite is leached to produce high-grade potassium sulfate. Water is heated and introduced to the crystallizer to leach the $MgSO_4$ from the schoenite. Concentrated sulfate leach liquor is withdrawn from the crystallizer, cooled, and introduced to the fifth-stage conversion reactor.

A slurry of high-grade potassium sulfate is withdrawn from the crystallizer and is filtered, the filtrate being recycled to the crystallizer. The filter residue, which is essentially pure $K_2SO_4$, is dried and otherwise treated as necessary, e.g., by washing and/or compaction, to produce the commercial product.

The schoenite-conversion plant end liquor is introduced to a cooling pond, wherein it is cooled to produce a schoenite-containing crystal crop. The pond effluent may be further treated but essentially all of the potassium values thereof are ultimately recycled to the kainite-producing solar pond system.

The modifier "essentially" is used herein and in the claims to avoid the implication that the terms modified thereby; e.g., "pure" and "free," are to be taken literally. The expression "essentially pure schoenite" means schoenite that would be regarded by those skilled in the art as being pure in a practical sense. Schoenite material which contains less than about 1 percent by weight chlorine, for example, may be leached in conventional manner to produce commercial quality potassium sulfate without the necessity for taking special steps to remove impurities carried by the schoenite material. Such material is thus considered to be "essentially free from NaCl" because NaCl is present in an amount too small to impair the quality of potassium sulfate produced by such a leaching procedure. While commercial grade $K_2SO_4$ containing less than about 0.1 percent by weight chlorine is produced from such material by a single leaching procedure, even higher grade $K_2SO_4$ may be produced by incorporating additional leaching steps in the process.

Reference herein to specific details of the process described is not intended to restrict the invention to such details. It is recognized that the procedures herein can be varied without departing from the principals and generic teachings of this disclosure.

We claim:

1. A cyclical method for producing potassium sulfate, which comprises:
   contacting essentially pure schoenite in a leaching step with sufficient water to leach the magnesium sulfate therefrom, thereby producing a slurry of potassium sulfate in a sulfate leach liquor;
   separating the potassium sulfate from the sulfate leach liquor;
   using the sulfate leach liquor in a schoenite-conversion step to contact materials from a solar pond harvest of potassium-containing double salts of magnesium sulfate in admixture with soluble impurities, the major soluble impurity being sodium chloride, said sulfate leach liquor being used in approximately the amount which just dissolves all of said soluble impurities, thereby to form a slurry of essentially pure schoenite in a schoenite-conversion end liquor;
   separating the essentially pure schoenite from the schoenite-conversion end liquor;
   recycling the essentially pure schoenite to the aforementioned leaching step;
   introducing the schoenite-conversion end liquor to a solar pond system for the recovery of potassium values therefrom as potassium-containing double salts of magnesium sulfate;
   and recycling said potassium-containing double salts of magnesium sulfate to the aforementioned schoenite-conversion step.

2. The method of claim 1 wherein the composition of the materials from the solar pond harvest contacted by the sulfate leach liquor in the schoenite-conversion step is controlled to produce a schoenite-conversion end liquor which is approximately saturated with respect to NaCl, contains less than about 30 moles $MgCl_2$ per 1,000 moles $H_2O$, and is unsaturated with respect to $MgSO_4$.

3. The method of claim 2 wherein the solar pond harvest materials comprise a high-grade kainite crystal crop in admixture with free hydrated magnesium sulfate and sodium chloride.

4. The method of claim 3 wherein the high-grade kainite crystal crop initially contains at least about 70 percent by weight kainite, and no more than about 20 percent by weight NaCl, the remainder being essentially all epsomite.

5. The method of claim 4 wherein some of the kainite and epsomite are prereacted prior to being introduced to the schoenite-conversion step so that a portion of the material contacted by the sulfate leach liquor is schoenite.

6. The method of claim 3 wherein schoenite-conversion end liquor is cooled to produce a schoenite-containing crystal crop and said crystal crop is recycled to said schoenite-conversion step as a portion of said solar pond harvest materials.

7. The method of claim 1 wherein the schoenite-conversion step of the process is conducted at a temperature below about 30° C.

8. The method of claim 7, wherein the residence time of the schoenite-conversion step is below about 30 minutes.

9. The method of claim 8, wherein the schoenite-conversion step of the process is conducted at a temperature between about 15° C. and about 25° C.

10. In a cyclical process for converting potassium-containing double salts of magnesium sulfate to potassium sulfate by contacting an admixture of the double salt and soluble impurities, including as the major impurity sodium chloride, with sulfate-containing leach liquor obtained subsequently in the process to dissolve the impurities and produce substantially pure schoenite and a sulfate-containing schoenite-conversion end liquor, leaching the schoenite to produce potassium sulfate and the aforesaid sulfate-containing leach liquor, and treating the schoenite-conversion end liquor to recover additional potassium values therefrom, the improvement which comprises:
    limiting the amount of double salt converted by the total process to that contained in the quantity of admixture which approximately saturates the sulfate-containing leach liquor with sodium chloride;
    treating the conversion end liquor to obtain additional potassium-containing double salt of magnesium sulfate; and
    recycling said additional potassium-containing double salt of magnesium sulfate to the process to be contacted by said sulfate-containing leach liquor.

11. The improvement of claim 10, wherein the conversion end liquor is cooled to cause schoenite to crystallize therefrom and the schoenite is recycled to the process.

12. The improvement of claim 10, wherein the conversion end liquor is mixed with brines in a solar pond system and subjected to evaporation to produce a high-grade kainite crystal crop, and said kainite crystal crop is recycled to the process.

13. In a process for producing potassium sulfate from a solar pond crystal crop of potassium-containing double salts of magnesium sulfate in admixture with sodium chloride, which process involves contacting the crystal crop with sufficient sulfate-containing liquor, of a composition such as that which results from the water leaching of schoenite, to dissolve all of the sodium chloride in the crystal crop and to produce an end liquor containing dissolved potassium, sodium, magnesium, chloride, and sulfate in proportions such that upon cooling schoenite crystallizes therefrom, the improvement which comprises:

returning said end liquor to the solar ponds and treating it therein to recover the dissolved potassium values as additional potassium-containing double salt of magnesium sulfate; and introducing said potassium-containing double salt to the process to be contacted with sulfate-containing liquor of the aforedescribed type.

14. The improvement of claim 13, wherein the said potassium-containing double salt is contacted with the said sulfate-containing liquor at a temperature between about 15° C. and about 30° C.

* * * * *

UNITED STATES PATENT OFFICE
CERTIFICATE OF CORRECTION

Patent No. 3,634,041            Dated January 11, 1972

Inventor(s) John Ryan, et al

It is certified that error appears in the above-identified patent and that said Letters Patent are hereby corrected as shown below:

Column 2, line 1, after "NaCl" insert a comma --(,)--;

Column 3, line 5, change "$SO_4$ ," to --$SO_4^=$, --;

Column 4, line 51, change "an" to --and--.

Signed and sealed this 13th day of June 1972.

(SEAL)
Attest:

EDWARD M. FLETCHER, JR.          ROBERT GOTTSCHALK
Attesting Officer                    Commissioner of Patents